United States Patent
Agrawal et al.

(10) Patent No.: US 9,104,345 B2
(45) Date of Patent: *Aug. 11, 2015

(54) RATE CONTROLLED FIRST IN FIRST OUT (FIFO) QUEUES FOR CLOCK DOMAIN CROSSING

(71) Applicant: Juniper Networks, Inc., Sunnyvale, CA (US)

(72) Inventors: Anurag Agrawal, Santa Clara, CA (US); Philip A. Thomas, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/211,805

(22) Filed: Mar. 14, 2014

(65) Prior Publication Data

US 2014/0201398 A1    Jul. 17, 2014

Related U.S. Application Data

(63) Continuation of application No. 12/957,669, filed on Dec. 1, 2010, now Pat. No. 8,713,221.

(51) Int. Cl.
*G06F 3/00* (2006.01)
*G06F 1/04* (2006.01)
*G06F 5/12* (2006.01)

(52) U.S. Cl.
CPC ... *G06F 5/12* (2013.01); *G06F 1/04* (2013.01)

(58) Field of Classification Search
CPC ............ H04L 7/0025; H01L 27/11898; G06F 13/4273; G11C 7/22; G11C 7/1072; G11C 7/227
See application file for complete search history.

(56) References Cited

U.S. PATENT DOCUMENTS

| | | | |
|---|---|---|---|
| 6,385,126 B2 | 5/2002 | Jung et al. | |
| 8,249,171 B2* | 8/2012 | Ying et al. | 375/240.28 |
| 2002/0015423 A1* | 2/2002 | Rakib et al. | 370/485 |
| 2003/0059945 A1* | 3/2003 | Dzekunov et al. | 435/461 |
| 2004/0155806 A1 | 8/2004 | Lee | |
| 2006/0190758 A1 | 8/2006 | Wickeraad | |
| 2008/0112438 A1* | 5/2008 | Ying et al. | 370/505 |
| 2009/0040082 A1* | 2/2009 | Hinz et al. | 341/100 |

OTHER PUBLICATIONS

Co-pending U.S. Appl. No. 12/957,669 by Anurag Agrawal et al., filed Dec. 1, 2010, entitled "Rate Controlled First in First out (FIFO) Queues for Clock Domain Crossing", 26 pages.

* cited by examiner

*Primary Examiner* — Hyun Nam
(74) *Attorney, Agent, or Firm* — Harrity & Harrity, LLP

(57) ABSTRACT

First in, first out (FIFO) queues may be used to transfer data between a producer clock domain and a number of consumer clock domains. In one implementation, a control component for the FIFO queues may include a number of counters, corresponding to each of the consumer clock domains, each of the counters maintaining a count value relating to an amount of data read by the corresponding consumer clock domain. The control component may additionally include a credit deduction component coupled to the count values of the counters, the credit deduction component determining whether any of the count values is above a threshold, and in response to the determination that any of the count values is above the threshold, reducing the count value of each of the counters and issuing a write pulse signal to the producer clock domain, the write pulse signal causing the producer clock domain to perform a write operation to the FIFO queues.

20 Claims, 5 Drawing Sheets

RATE CONTROLLED FIRST IN FIRST OUT (FIFO) QUEUES FOR CLOCK DOMAIN CROSSING

RELATED APPLICATION

This application is a continuation of U.S. patent application Ser. No. 12/957,669, filed Dec. 1, 2010, the disclosure of which is incorporated herein by reference.

BACKGROUND

First in, first out (FIFO) queues are commonly used to organize and control data relative to time and prioritization. In a FIFO queue, data is output in the order in which it is received, so that the first data unit that enters the queue is the first data unit to be output from the queue.

FIFO queues may be particularly useful in controlling data transfer across two different clock domains. Data may be asynchronously written to and read from the FIFO queue using separate write and read signals. In such a system, errors in the operation of the FIFO queue may occur for a number of reasons, such as overflow and under-run of the FIFO.

Additionally, the depth of an asynchronous FIFO (i.e., the number of entries) may depend on the difference between the write and read rates as well as on the latency introduced by any control mechanism that is used to throttle writes to the FIFO. If the introduced latency is high, a deeper FIFO may be required. The complexity of the control mechanism may increase in situations in which the write domain produces multiple words per clock cycle that are to be sent to different read domains. In this situation, a number of asynchronous FIFOs may be used, which may increase the complexity of the control mechanism.

SUMMARY

One implementation may be to a system that includes a number of asynchronous FIFO queues; a producer clock domain, operating at a first clock frequency, to generate data and write the data to each of the FIFO queues; and a number of consumer clock domains, each connected to a respective one of the FIFO queues, to read the data, at a second clock frequency, from the respective FIFO queue. The system may further include a control component that includes a number of counters, corresponding to each of the consumer clock domains, each of the counters maintaining a count value relating to an amount of data read by the corresponding consumer clock domain; and a credit deduction component coupled to receive the count values of the counters, the credit deduction component determining whether any of the count values is above a threshold, and in response to the determination that any of the count values is above the threshold, reducing the count value of each of the counters and issuing a write pulse signal to the producer clock domain, the write pulse signal causing the producer clock domain to perform a write operation to each of the FIFO queues.

Another implementation may be directed to a method that includes receiving an indication that a read operation has been performed on one of a number of asynchronous FIFO queues; incrementing a credit counter, of a number of credit counters, corresponding to the FIFO queue, in response to the indication that the read operation has been performed; and determining whether any of the credit counters includes a value greater than a threshold value. The method may further include subtracting, in response to the determination that at least one of the credit counters includes a value greater than the threshold value, the threshold value from all of the credit counters; and generating, in response to the determination that at least one of the credit counters includes a value greater than the threshold value, a write pulse signal to control a producer clock domain to perform a write operation to each of the FIFO queues.

In yet another possible implementation, a device may include a control path for each of a number of consumer clock domains that receive data from a producer clock domain through a corresponding number of asynchronous FIFO queues. The control path may include a clock divider to receive a read clock signal indicating a read operation has been performed by the corresponding consumer clock domain, the clock divider reducing the frequency of the read clock signal, and a credit counter to maintain a count value relating to an amount of data read by the corresponding consumer clock domain, the credit counter being incremented in response to the reduced frequency read clock signal. The device may further include a credit deduction component connected to the credit counters for each of the consumer clock domains, the credit deduction component determining whether any of the count values is above a threshold, and in response to the determination that any of the count values is above the threshold, reducing the count value for the credit counters for each of the consumer clock domains and issuing a write pulse signal to the producer clock domain, the write pulse signal causing the producer clock domain to perform a write operation to each of the FIFO queues.

BRIEF DESCRIPTION OF THE DRAWINGS

The accompanying drawings, which are incorporated in and constitute a part of this specification, illustrate one or more implementations described herein and, together with the description, explain the invention. In the drawings.

DETAILED DESCRIPTION

The following detailed description refers to the accompanying drawings. The same reference numbers in different drawings may identify the same or similar elements.

Techniques described herein may relate to the transmission of data from a producer clock domain to a number of consumer clock domains using asynchronous FIFOs. A control component may control the rate, in the consumer clock domain, at which data is written to the FIFOs, such that FIFO overflow is avoided and timing tolerances across all of the asynchronous FIFOs may be kept tight.

In one implementation, a credit counter may be associated with each consumer clock domain. Each credit counter may keep track of FIFO reads performed by the corresponding consumer clock domain. When any of the counters are above a threshold, such as a threshold corresponding to enough data for one write operation by the producer clock domain, all of the counters may be decremented by the threshold and a write pulse may be issued to the producer clock domain. The write pulse may enable the producer clock domain to write to the FIFO queues.

The terms "component" and "logic," as used herein, are intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
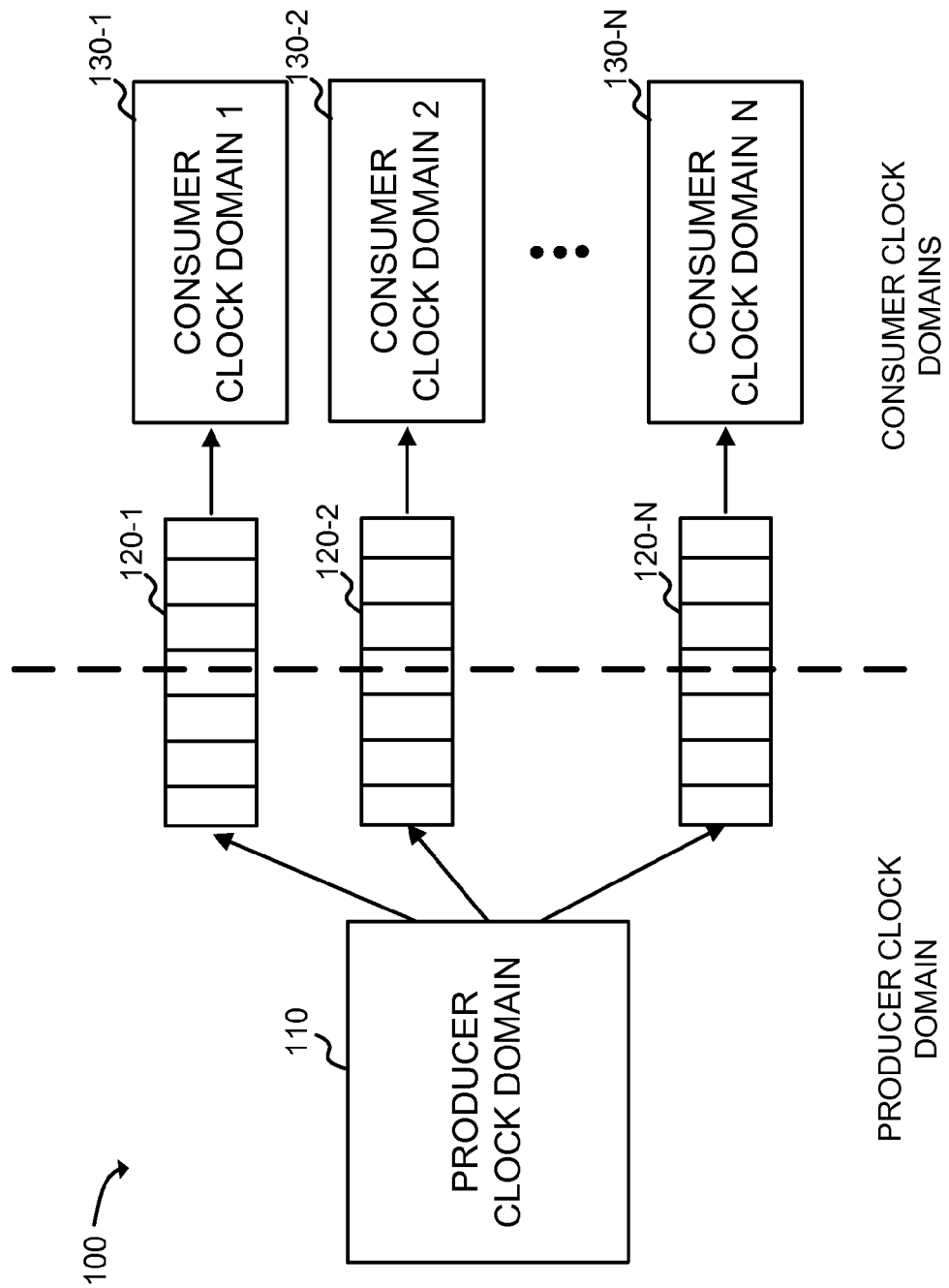
FIG. 1 is a diagram of an example system according to implementations described herein.

FIG. 1 is a diagram of an example system 100 according to implementations described herein. As shown, system 100 may include a producer clock domain 110 and one or more consumer clock domains 130-1 through 130-N (collectively referred to herein as "clock domains 130," and singularly as "clock domain 130"). Producer clock domain 110 may exchange data with consumer clock domains 130 using FIFO queues 120-1 through 120-N (collectively referred to herein as "FIFO queues 120," and singularly as "FIFO queue 120"). Each FIFO queue 120 may be an asynchronous FIFO that receives data from producer clock domain 110, based on a clock signal or other signal from producer clock domain 110, and transmits the data to a corresponding consumer clock domains 130-1 through 130-N, based on a second clock signal or other signal from consumer clock domain 130. FIFO queues 120 may thus be used to implement a communication bridge between domains 110 and 130.

Domains 110 and 130 may generally represent sets of electronic components that function asynchronously from one another (i.e., based on separate clock signals). For example, clock domains 110 and 130 may represent different central processing units (CPUs), graphics processing units (GPUs), processing elements for a network device (e.g., a router, a switch, a gateway, etc.), other computing components, or different sections of a CPU, GPU, network device, etc. In one implementation, the write frequency of producer clock domain 110 may be different (e.g., higher) than the read frequency of consumer clock domains 130 and each of consumer clock domains 130 may be independent of one another but operate at the same clock frequency (i.e., the consumer clocks are plesio-synchronous clocks).

In one implementation, the write frequency of producer clock domain 110 may be greater than the read frequency of consumer clock domains 130. In this situation, a control component (not illustrated in FIG. 1) may be used to throttle writes to consumer clock domains 130 in order to ovoid overflows of FIFO queues 120. The control component will be discussed in more detail below.

Although a single FIFO queue 120 is illustrated as connecting producer clock domain 110 and each consumer clock domain 130, in some implementations, multiple FIFO queues 120 may connect domains 110 and 130. Further, in some implementations, multiple FIFO queues 120 may bi-directionally connect producer clock domain 110 and a consumer clock domain 130.

Figure 2:
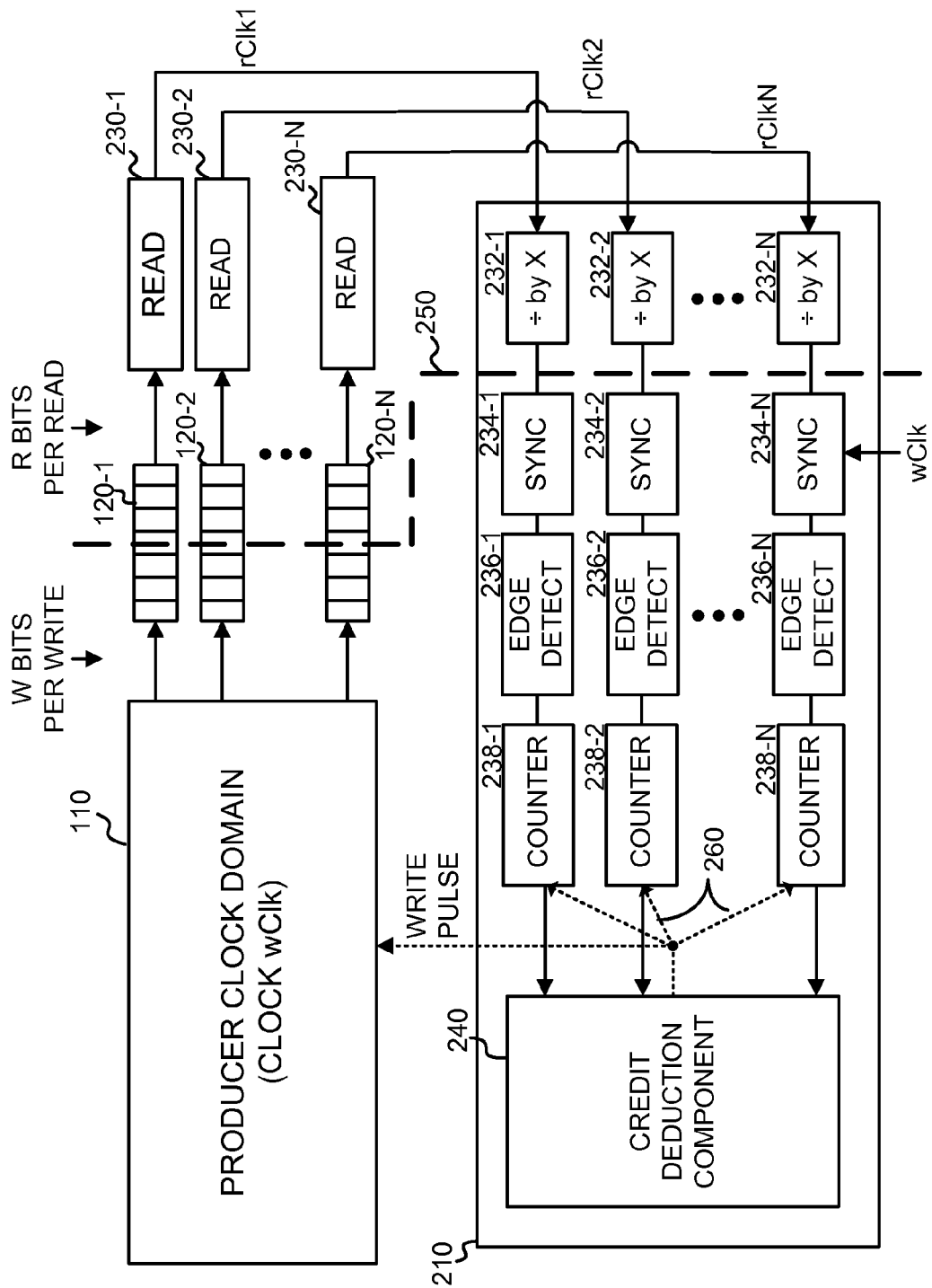
FIG. 2 is a diagram illustrating the system of FIG. 1 in additional detail.

FIG. 2 is a diagram illustrating system 100 in additional detail. As shown in FIG. 2, producer clock domain 110 may communicate with a number of consumer clock domains, illustrated as read component 230-1 through read component 230-N (collectively referred to herein as "read components 230," and singularly as "read component 230"), which may correspond to consumer clock domains 130-1 through 130-N, respectively. The communication between producer clock domain 1110 and read components 230 may be performed via asynchronous FIFO queues 120. A control component 210 may operate to provide flow control to data being written to asynchronous FIFO queues 120 to ensure that asynchronous FIFO queues 120 do not overflow.

In FIG. 2, assume that read components 230-1 through 230-N read from asynchronous FIFO queues 120 based on read clocks, rClk1 through rClkN, respectively, where each read clock is independently generated by read components 230-1 through 230-N but each read clock operates at the same frequency (i.e., the read clocks are plesio-synchronous clocks). Further, assume that producer clock domain 110 operates at a second clock frequency, wClk. Producer clock domain 110 may write, for each write cycle, W bits to each asynchronous FIFO queue 120. Read components 230 may correspondingly read, at each respective read clock cycle rClk1 through rClkN, R bits from an asynchronous FIFO queue 120, where R and W may be different. In FIG. 2, dashed line 250 may illustrate a division between the read and write clock domains.

Control component 210 may generally operate to independently detect the read clock edges in the write domain. The detected edges may be used to accumulate credits for each of the read clock domains. As shown in FIG. 2, control component 210 may include, for each read clock domain 230, a counter control path that includes: a clock divider ("÷ by X") 232-1 through 232-N, a synchronizer ("sync") 234-1 through 234-N, an edge detector 236-1 through 236-N, and a counter 238-1 through 238-N. The current value of each counter 236 may be monitored by a credit deduction component 240. When any one of counters 238 is above a threshold level, credit deduction component 240 may issue a write pulse to producer clock domain 110 and a credit reducing pulse, labeled as pulse 260, to each counter 238.

Each clock divider 232 may receive a read clock from one of read components 230 and operate to divide the frequency of the read clock to a lower frequency. Lowering the frequency of the input read clock ensures that the clock can be properly sampled by the write clock, wClk, through synchronizers 234. In one implementation, each clock divider 232 may divide its input clock by an integer value, X. For example, each clock divider may be implemented as a two-bit counter, in which case X is four.

The divided rClks, after being output from clock dividers 232, may be synchronized through synchronizers 234. Each synchronizer 234 may be, for example, a multi-stage (e.g., two or three stage) set of flip-flops that are all clocked by wClk. Synchronizers 234 may thus operate to sample the divided rClks signals based on wClk.

Edge detectorss 236 may each operate to identify the rising and falling edges of the divided rClk signals, as output from synchronizers 234. Edge detectors 236 may each generate one pulse per detected rising and falling edge.

Counters 238 may each include logic to keep track of the number of FIFO read "credits" available for each read component 230. Each counter 238 may include a signed counter. In one implementation, counters 238 may be signed counters that each have the capacity to keep track of the range −W to 2*W, where, as mentioned, W may be the number of bits generated for each write cycle to each asynchronous FIFO queue 120. At each pulse from an edge detector 236, an appropriate count value, to reflect the number of bits read per divided rClk edge, may be added to counter 238. If the number of bits read from FIFOs 120 by a read component 230 is R, the appropriate count value may be X*R/2. To avoid handling floating point numbers, X may be chosen so that the count value is an integer.

Credit deduction component 240 may include logic to monitor the current credit value of each of counters 238. Credit deduction component 240 may determine whether any one of counters 238 is greater than a threshold value. In one implementation, the threshold value may be equal to W. If any counter 238 meets this criteria, credit deduction component 240 may generate a credit reducing pulse 260 to each of counters 238. In response to the credit reducing pulse, each of counters 238 may subtract the threshold value (e.g., W) from the respective credit count of counters 238. In some cases, a counter 238 may receive the credit reducing pulse even though counter 238 has not reached the threshold value. In this case, counter 238 may go negative.

The credit reducing pulse generated by credit deduction component 240 may also be used to generate a write pulse to producer clock domain 110. Each time a write pulse is received, producer clock domain 110 may initiate a write operation to FIFO queues 120.

Although FIG. 2 shows example components of system 100, in other implementations, system 100 may include fewer components, different components, differently arranged components, or additional components than depicted in FIG. 2. Alternatively, or additionally, one or more components of system 100 may perform one or more other tasks described as being performed by one or more other components of system 100.

Figure 3:
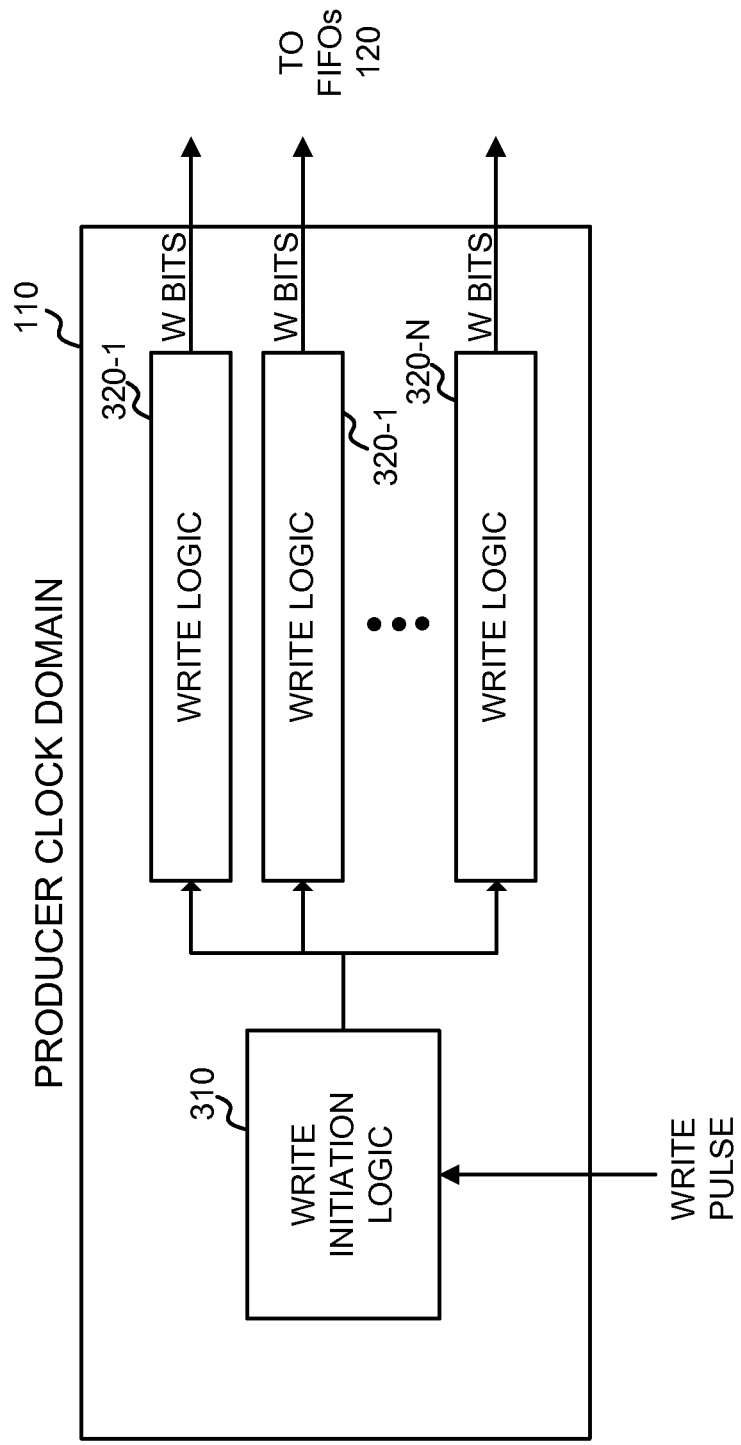
FIG. 3 is a diagram illustrating an example of an implementation of components in a producer clock domain shown in FIG. 2.

FIG. 3 is a diagram illustrating an implementation of select example components of producer clock domain 110. Producer clock domain 110, as illustrated, may include write initiation logic 310 and a number of write logic elements 320-1 through 320-N.

As previously mentioned, producer clock domain 110 may write to a number of consumer clock domains 130 through asynchronous FIFO queues 120. Each write operation may write a W bit length data unit to each FIFO queue 120, and may be performed in response to the write pulse generated by control component 210 and received by write initiation logic 310. Write initiation logic 310 may include logic to detect the write pulse and begin the write operation.

Write logic elements 320-1 through 320-N may each include logic to control the writing of data to asynchronous FIFO queues 120. Each write logic element 320 may include, for example, a number of pipeline stages that process and write data, received from or in response to a control signal from write initiation logic 310, to asynchronous FIFO queues 120.

Although FIG. 3 shows example components of producer clock domain 110, in other implementations, producer clock domain 110 may include fewer components, different components, differently arranged components, or additional components than depicted in FIG. 3. Alternatively, or additionally, one or more components of producer clock domain 110 may perform one or more other tasks described as being performed by one or more other components of producer clock domain 110.

Figure 4:
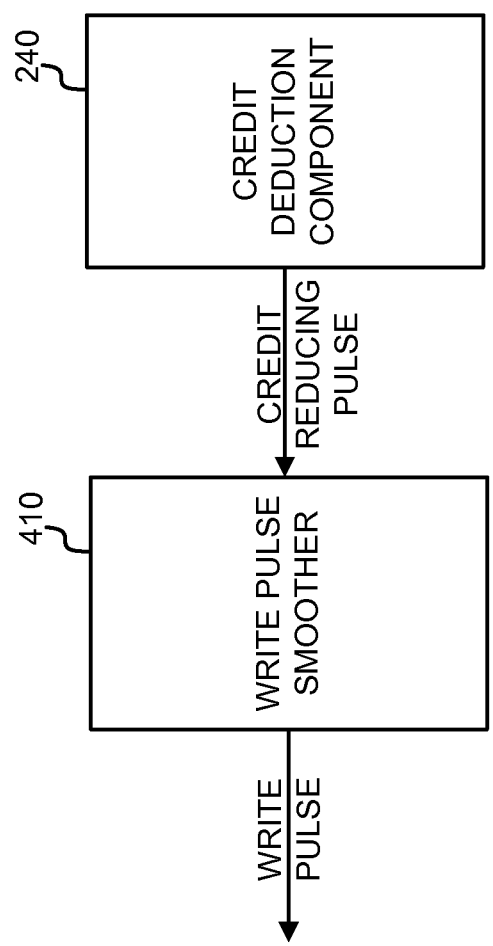
FIG. 4 is a diagram illustrating an example of additional components that may be included in a control component shown in FIG. 2.

FIG. 4 is a diagram illustrating an example of additional components that may be included in control component 210. As particularly shown in FIG. 4, a write pulse smoother 410 may be connected to credit deduction component 240. Write pulse smoother 410 may receive the credit reducing pulse, generated by credit deduction component 240, and generate the write pulse. Write pulse smoother 410 may include logic to limit the minimum separation between the write pulses. Write pulses that are too close to one another may increase the complexity required for write initiation logic 310 and/or the path to write initiation logic 310. Write pulse smoother 410 may include one or more counters, and/or other logic, to limit the minimum separation between the write pulses while still maintaining the average rate of the write pulses.

Write pulse smoother 410 may act to reduce jitter in the write pulses. Reducing jitter may be important as increasing jitter may require larger sized asynchronous FIFO queues 120 to handle possible overflow and under-run situations.

Figure 5:
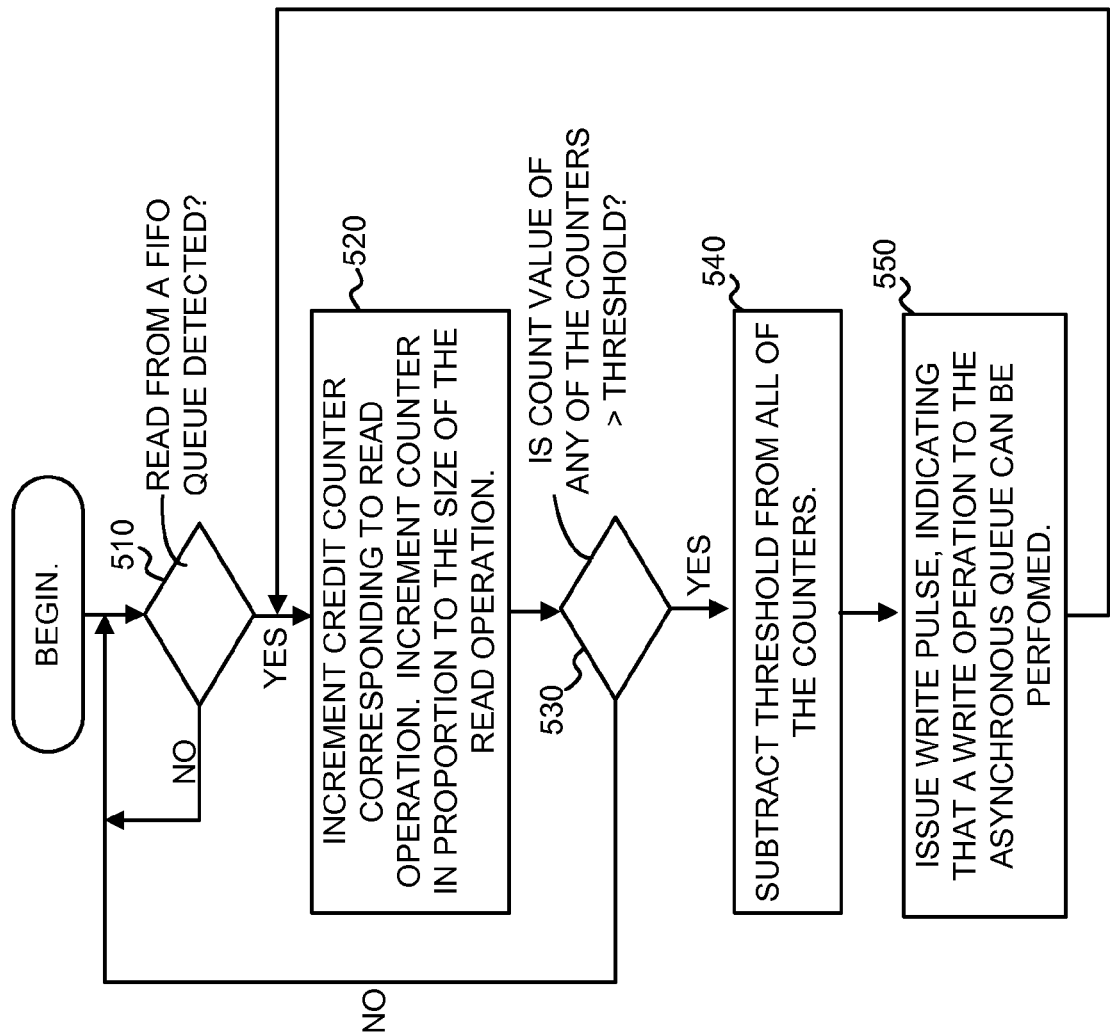
FIG. 5 is a flowchart illustrating an example of a process for controlling asynchronous FIFO queues shown in FIGS. 1 and 2.

FIG. 5 is a flowchart illustrating an example of a process 500 for controlling asynchronous FIFO queues 120. Process 500 may be performed, for instance, by control component 210 in controlling a producer clock domain 110 that writes data to a number of consumer clock domains 130 using asynchronous FIFO queues 120.

Process 500 may include detecting a read operation, by one of the consumer clock domains, of an asynchronous FIFO queue (block 510). As shown in FIG. 2, for example, detection of a read operation may be performed by edge detect components 236. In FIG. 2, because of clock dividers 232, not every read operation is detected. In the implementation of control component 210, in FIG. 2, in order to allow the read operations to be effectively sampled using the producer clock domain clock signal (wClk), the read clock signal may first be divided.

Process 500 may further include, when a read operation is detected (block 510—YES), incrementing a credit counter, in proportion to the size of the read operation, corresponding to the detected read operation (block 520). In control component 210, for example, counter 238 may be incremented in response to the detection of a read operation. Counter 238 may be incremented by X*R/2 (where X is the clock dividing factor and R is the size of each read operation), to take into account the operation of divider 232 (the X factor), the dual edged edge detection (the ½ factor) and the size of each read operation (the R factor).

Process 500 may further include determining whether a count value of any of the counters is greater than a threshold value (block 530). The threshold value may be, for example, a value equal to the size of a write operation. When any of the counters is greater than the threshold (block 530—YES), the threshold may be subtracted from every one of the counters (block 540). Additionally, a write pulse may be issued to the producer clock domain (block 550), indicating that a write operation to asynchronous FIFOs 120 may be performed.

In controlling asynchronous FIFO queues 120, it can be desirable to keep the skew between the different read components 230 as close to zero as possible. This can be particularly helpful when sending data words over a long serial channel. In such a system, any skew added on the transmit side can add complexity/challenges on the receiver side for realigning data coming from different serial channels.

Control component 210, as described above, can advantageously keep all of asynchronous FIFO queues 120 balanced within relatively tight differences, such as a couple of W-bit word entries. Thus, skew is small. Additionally, an added benefit is that relatively shallow asynchronous FIFOs 120 may be used.

Control component 210 may provide the ability to independently enable or disable asynchronous FIFO queues 120. This can be particularly advantageous, specifically in the case of when only a few read components 230 were enabled to begin with and one or more are being enabled/disabled for operation going forward.

Enabling or disabling read components 230 during operation may be possible because, since there may be no phase relationship between different rClks, the rising and falling edges of these clocks may not align with each other. This may cause counters 238 to be updated independently by respective edge detect components 236. Counters 238 may thus stay out-of-sync from each other forever although the maximum delta between any pair of enabled counters should never exceed W. In one implementation, control component 210 may additionally require that any newly enabled rClk (and associated asynchronous FIFO queue 120 and read logic component 230) be allowed to increment its respective counter 238 after a credit reducing pulse is generated (i.e., at least one counter is going to be zero) and one of the enabled counters 238 gets incremented. This way the newly added counter 238 can only be off, at most, by W. Also, if a read component 230 and its associated logic is shutting off, control component 210 may reset the respective counter 238 to a negative number and hold the counter this way until re-enabled. This may disable the counter from "write pulse" generation logic.

Counters 238 may be thought of as being reflection of the occupancy of asynchronous FIFO queues 120. If counters 238 are well balanced within tight limits, asynchronous FIFO queues 120 should also be balanced and within tight limits of one another. By forcing a newly enabled read component 230 to trail an already enabled read component, it may be guaranteed that the rate of write pulses is unaltered by the newly enabled read component 230. Otherwise, overflow may occur for the already enabled asynchronous FIFO queues 120. To avoid under-run of asynchronous FIFO queues 120, each read component 230 may be controlled to wait for build up of at least one W-bit word in its asynchronous FIFO queue 120 before it can start pulling out R-bits per rClk from its asynchronous FIFO queue 120.

The minimum startup entries needed in asynchronous FIFO queues 120 before a pop (read) operation can be performed may depend on the factor (X*R/2) and W. If W is an integer multiple of (X*R/2), then only one entry may be enough, otherwise two entries may be required for startup. For example, assume that two entries are required and any two FIFO queues 120 can have a delta of one entry (max W bits). Here, a safe number of required entries may be set at one more than the minimum, which may be three (a newly enabled asynchronous FIFO queue 120 will start read operations when it accumulates two entries but by that time others could be at three entries). Additionally, to ensure safe operation around asynchronous boundaries, assuming three is the minimum number of entries, the FIFO queue depth would be a maximum of four entries, where each entry is W-bits wide. This gives a cushion of one extra entry for under-run prevention. Since the FIFO queue states in the write and read domains may have lag due to synchronization, it may be desirable to add a cushion of one or two more entries, making the asynchronous FIFO queue depth to be, for example, five entries, where a minimum of three entries are to build up before read operations begin.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

While a series of blocks has been described in FIG. 5, the order of the blocks may vary in other implementations. Also, non-dependent blocks may be performed in parallel.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

Further, certain aspects described herein may be implemented as "logic" or as a "component" that performs one or more functions. This logic or component may include hardware, such as an ASIC or a FPGA, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A system comprising:
   a memory; and
   one or more processors to:
   detect a read operation of an asynchronous first in, first out (FIFO) queue;
   increment a credit counter based on the read operation;
   determine that a count value of the credit counter satisfies a threshold value;
   generate a write pulse signal to perform a write operation to the asynchronous FIFO queue based on the count value satisfying the threshold value;
   smooth the write pulse signal to reduce a minimum separation between write pulses in the write pulse signal; and
   issue the write pulse signal after smoothing the write pulse signal.

2. The system of claim 1, where, when detecting the read operation, the one or more processors are to:
   receive a read clock,
   identify rising and falling edges of one or more signals based on the read clock, and
   detect the read operation based on identifying the rising and falling edges of the one or more signals.

3. The system of claim 1, where, when detecting the read operation, the one or more processors are to:
   receive a read clock from a component that reads from the asynchronous FIFO queue, and
   detect the read operation based on the read clock.

4. The system of claim 1, where, when incrementing the credit counter based on the read operation, the one or more processors are to:
   determine a size of the read operation, and
   increment the credit counter based on the size of the read operation.

5. The system of claim 1, where the threshold value is equal to a size of the write operation.

6. The system of claim 1, where the one or more processors are further to:
   subtract the threshold value from the count value, of the credit counter, based on the count value satisfying the threshold value.

7. The system of claim 1, where, when issuing the write pulse signal, the one or more processors are to:
   issue the write pulse signal to a producer clock domain.

8. The system of claim 1, where the write pulse signal indicates that the write operation to the asynchronous FIFO queue is to be performed.

9. A method comprising:
determining, by one or more devices, that a count value of a credit counter satisfies a threshold value;
generating, by the one or more devices, a write pulse signal to perform a write operation to an asynchronous first in, first out (FIFO) queue based on the count value satisfying the threshold value;
smoothing, by the one or more devices, the write pulse signal to reduce a minimum separation between write pulses in the write pulse signal; and
performing, by the one or more devices and based on the write pulse signal, the write operation to the asynchronous FIFO queue after smoothing the write pulse signal.

10. The method of claim 9, further comprising:
detecting a read operation of the asynchronous FIFO queue; and
incrementing the count value based on the read operation.

11. The method of claim 10, where detecting the read operation comprises:
receiving a read clock from a component that reads data from the asynchronous FIFO queue, and
detecting the read operation based on the read clock.

12. The method of claim 9, further comprising:
incrementing, before determining that the count value satisfies the threshold value, the count value based on a size of a read operation and a clock dividing factor.

13. The method of claim 9, further comprising:
subtracting the threshold value from the count value based on the count value satisfying the threshold value.

14. The method of claim 9, where an average rate of the write pulses is maintained as the minimum separation is reduced.

15. The method of claim 9, where smoothing the write pulse signal is further to reduce jitter in the write pulses.

16. A non-transitory computer-readable medium storing instructions, the instructions comprising:
one or more instructions that, when executed by at least one processor, cause the at least one processor to:
detect a read operation of an asynchronous first in, first out (FIFO) queue;
increment a credit counter based on the read operation;
determine that a count value of the credit counter satisfies a threshold value;
generate a write pulse signal based on the count value satisfying the threshold value;
smooth the write pulse signal to reduce jitter in write pulses associated with the write pulse signal; and
issue the write pulse signal after smoothing the write pulse signal.

17. The non-transitory computer-readable medium of claim 16, where the write pulse signal indicates that a component is to perform a write operation to the asynchronous FIFO queue.

18. The non-transitory computer-readable medium of claim 16, where the one or more instructions to issue the write pulse signal include:
one or more instructions that, when executed by the at least one processor, cause the at least one processor to:
issue the write pulse signal to a producer clock domain that provides data to the asynchronous FIFO queue and one or more other FIFO queues.

19. The non-transitory computer-readable medium of claim 16, where the one or more instructions to detect the read operation include:
one or more instructions that, when executed by the at least one processor, cause the at least one processor to:
receive a read clock from a read component that reads from the asynchronous FIFO queue,
divide the read clock to obtain a divided read clock, and
detect the read operation based on the divided read clock.

20. The non-transitory computer-readable medium of claim 16, where the instructions further comprise:
one or more instructions that, when executed by the at least one processor, cause the at least one processor to:
subtract the threshold value from the count value, of the credit counter, based on the count value satisfying the threshold value.

* * * * *